United States Patent
Takeichi

(10) Patent No.: US 9,891,730 B2
(45) Date of Patent: Feb. 13, 2018

(54) INFORMATION PROCESSING APPARATUS, INFORMATION PROCESSING METHOD THEREFOR, AND NON-TRANSITORY STORAGE MEDIUM

(71) Applicant: CANON KABUSHIKI KAISHA, Tokyo (JP)

(72) Inventor: Shinya Takeichi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 14/581,552

(22) Filed: Dec. 23, 2014

(65) Prior Publication Data

US 2015/0178249 A1    Jun. 25, 2015

(30) Foreign Application Priority Data

Dec. 25, 2013 (JP) .................. 2013-267140

(51) Int. Cl.
*G06F 3/041* (2006.01)
*G06F 17/30* (2006.01)

(52) U.S. Cl.
CPC ........ *G06F 3/041* (2013.01); *G06F 17/30905* (2013.01)

(58) Field of Classification Search
CPC ...... G06F 3/014; G06F 3/0146; G06F 3/0416; G06F 3/0412
USPC .......................... 345/168, 173, 174; 715/702
See application file for complete search history.

(56) References Cited

U.S. PATENT DOCUMENTS

| | | | | |
|---|---|---|---|---|
| 7,774,003 B1* | 8/2010 | Ortega | .................... | H04W 4/02 455/414.3 |
| 9,317,119 B2* | 4/2016 | Hirose | .................... | G06F 3/016 |
| 2006/0053387 A1* | 3/2006 | Ording | ................ | G06F 3/04883 715/773 |
| 2010/0238115 A1* | 9/2010 | Komaarashi | ............ | G06F 3/016 345/173 |
| 2014/0178843 A1* | 6/2014 | Smyth | .................... | G09B 19/00 434/238 |

FOREIGN PATENT DOCUMENTS

| | | |
|---|---|---|
| JP | H09-062446 A | 3/1997 |
| JP | 2000081939 A | 3/2000 |
| JP | 2004301869 A | 10/2004 |
| JP | 2010067208 A | 3/2010 |
| JP | 2011-180625 A | 9/2011 |
| JP | 2012008954 A | 1/2012 |
| JP | 2013037709 A | 2/2013 |

* cited by examiner

*Primary Examiner* — Calvin C Ma
(74) *Attorney, Agent, or Firm* — Canon U.S.A., Inc. IP Division

(57) ABSTRACT

An information processing apparatus includes a receiving unit configured to receive an update instruction to update at least a part of an image displayed on a display screen, an estimating unit configured to estimate a target position on the display screen before a user operation determines the target position, and a display control unit configured to, after the estimating unit estimates the target position, display an object displayed at the target position on the display screen at the estimated target position before an image displayed on the display screen is updated in response to the update instruction received by the receiving unit.

20 Claims, 14 Drawing Sheets

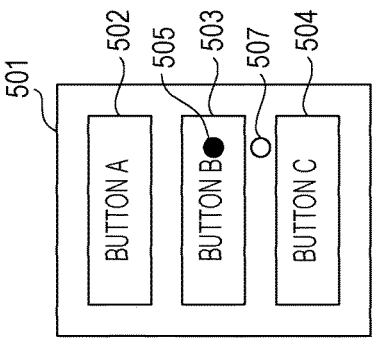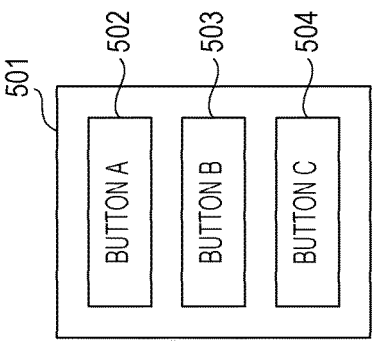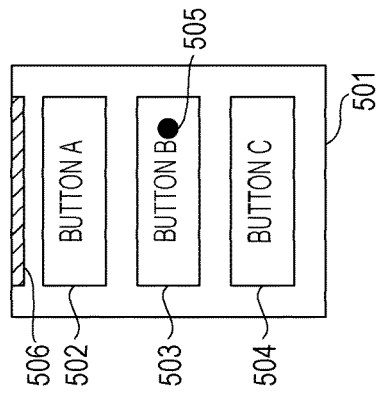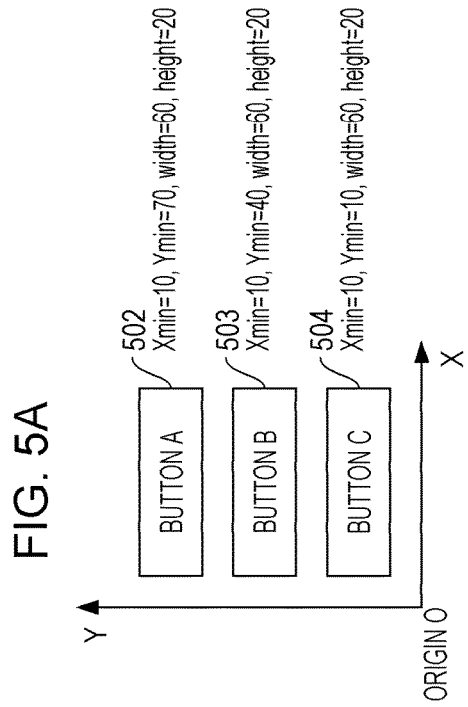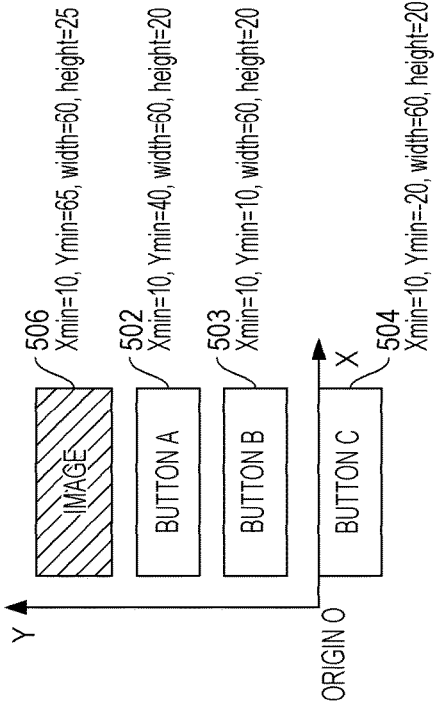

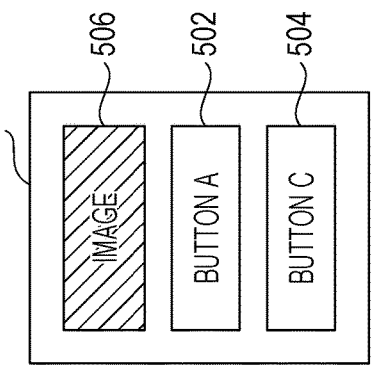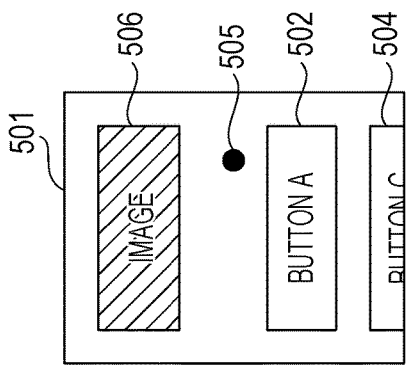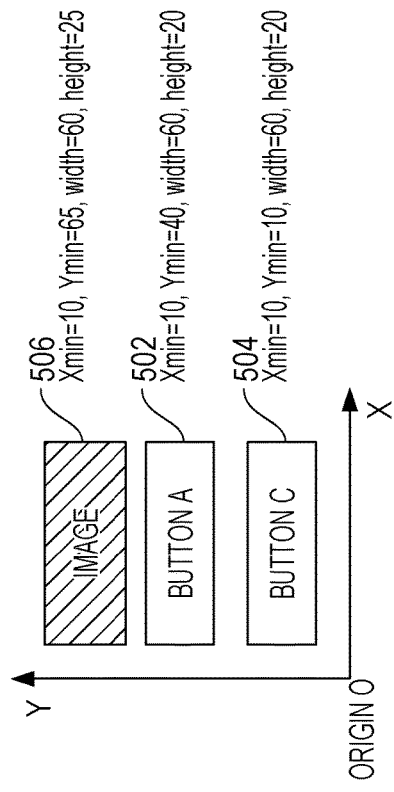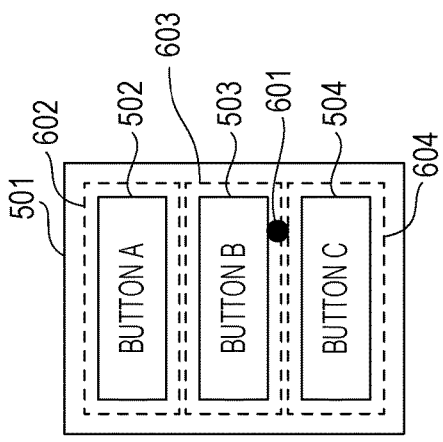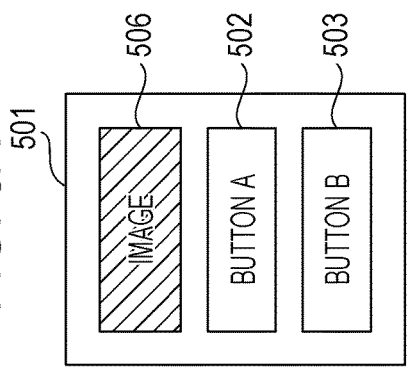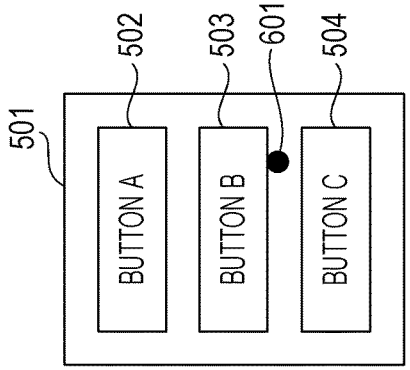

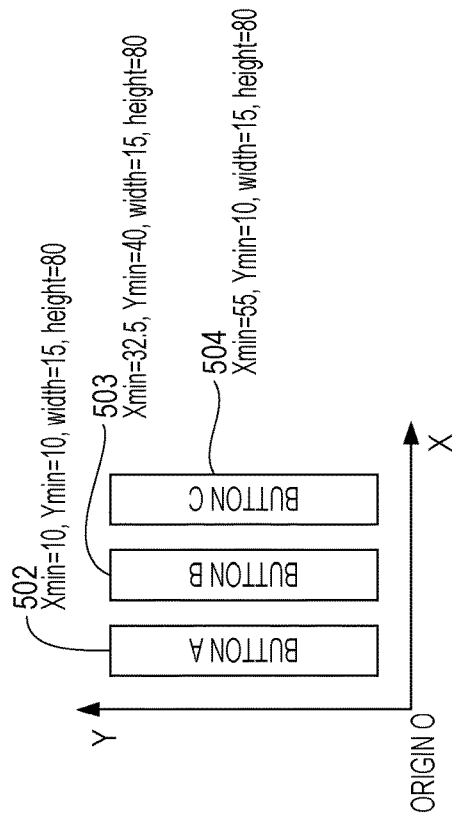
FIG. 7A
FIG. 7B
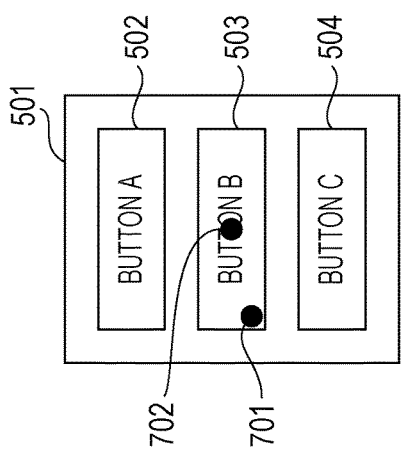
FIG. 7C
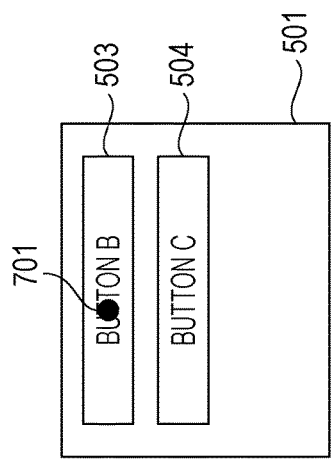
FIG. 7D

1304 Xmin=10, Ymin=70, width=50, height=20
1305 Xmin=60, Ymin=70, width=10, height=20
1303 Xmin=10, Ymin=70, width=60, height=20
1301 Xmin=10, Ymin=40, width=60, height=20
1302 Xmin=10, Ymin=10, width=60, height=20

1303 Xmin=10, Ymin=80, width=20, height=10
1304 Xmin=10, Ymin=10, width=20, height=70
1302 Xmin=70, Ymin=10, width=20, height=80
1301 Xmin=40, Ymin=10, width=20, height=80

INFORMATION PROCESSING APPARATUS, INFORMATION PROCESSING METHOD THEREFOR, AND NON-TRANSITORY STORAGE MEDIUM

BACKGROUND OF THE INVENTION

Field of the Invention

The present invention relates to technologies for recognizing an operation based on position information instructed on a display screen.

Description of the Related Art

In browsing one Web page on a browser, an image displayed on a screen may be updated at an unexpected time and the contents may be increased or decreased even though one same page is being browsed. This may occur in a case where a page being browsed is rendered by a browser before the loading of the page completes or a case where script processing may read another image.

Japanese Patent Laid-Open No. 2011-180625 may avoid placing an operation item on a screen after an update process at a position estimated to receive an input operation before the screen update. This may reduce erroneous operations even when an input is received after a screen update in a case where the timing of the screen update occurs simultaneously with the timing of an input operation performed by a user.

However, according to the technology in the past, the layout of the display screen after a display update may collapse for providing a region where an operation item is not placed.

SUMMARY OF THE INVENTION

The present invention provides an information processing apparatus including a receiving unit configured to receive an update instruction to update at least a part of an image displayed on a display screen, an estimating unit configured to estimate a target position on the display screen before a user operation determines the target position, and a display control unit configured to, after the estimating unit estimates the target position, display an object displayed at the target position on the display screen at the estimated target position before an image displayed on the display screen is updated in response to the update instruction received by the receiving unit.

Further features of the present invention will become apparent from the following description of exemplary embodiments with reference to the attached drawings.

BRIEF DESCRIPTION OF THE DRAWINGS

FIGS. 5A to 5F are schematic diagrams illustrating details of processing in the information processing apparatus according to the first exemplary embodiment.

FIGS. 6A to 6F are schematic diagrams illustrating details of processing in the information processing apparatus according to the first exemplary embodiment.

FIGS. 7A to 7D are schematic diagrams illustrating details of processing in the information processing apparatus according to the first exemplary embodiment.

DESCRIPTION OF THE EMBODIMENTS

Exemplary embodiments of the present invention will be described with reference to drawings. The following exemplary embodiments are given for illustration of examples of the present invention, and it is not intended that the present invention is limited by those exemplary embodiments. All of combinations of features according to the exemplary embodiments are not always required in the present invention. Like numbers refer to like parts throughout as much as possible.

First Exemplary Embodiment

Figure 1:
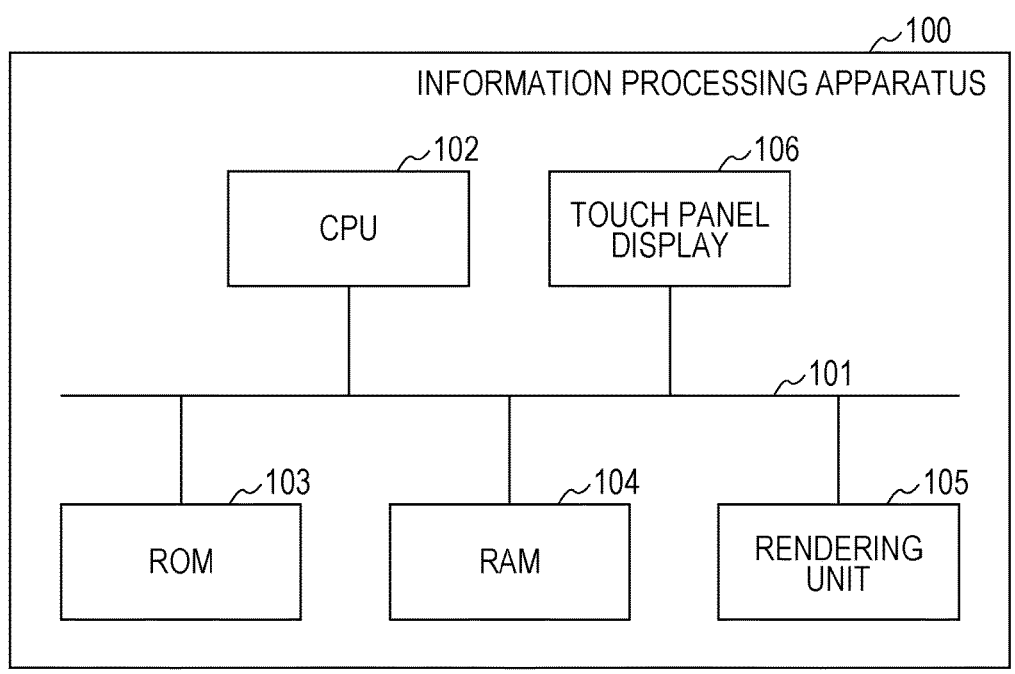
FIG. 1 is a block diagram illustrating an example of a hardware configuration of an information processing apparatus.

FIG. 1 is a block diagram illustrating a hardware configuration of an information processing apparatus according to a first exemplary embodiment. Referring to FIG. 1, an information processing apparatus 100 includes a bus 101, a CPU 102, a ROM 103, a RAM 104, a rendering unit 105, and a touch panel display 106. The CPU 102 is configured to execute functions of processing units included in the apparatus and control cooperative operations and execution timings between them. The ROM 103 is configured to store a program and a parameter which do not require any change. The RAM 104 includes an SDRAM and a DRAM and is configured to temporarily store a program and data supplied from an external apparatus, for example. The RAM 104 has a work area for processing performed by the CPU 102, a data saving area for error processing and a load area for the control program. The rendering unit 105 is configured to output graphics rendered by a program to the touch panel display. The touch panel display 106 is a device configured to function as a touch sensor or the like for capturing user input operation information and a display screen configured for display and output. The touch panel display 106 may have a display screen which detects a contact part touched by a human hand, for example, and may identify the touched position as one coordinate point on a coordinate plane defined on the display screen. When the contact part has some area, the touch panel display 106 identifies the coordinates of the center of gravity or the center of the contact part. Hereinafter, the point will be called a touch position. The touch position is detectable for each of one or more contact parts (where a plurality of contact parts exist when a touch panel is touched by a plurality of fingers) regarded as being independent among the one or more contact parts detected on a touch panel. In other words, the touch panel display 106 of this exemplary embodiment has a multi-touch detection function and is capable of detecting all of one or more touch positions instructed at a same time. According to this exemplary embodiment, position information of a tip of a user's finger out of contact with but close to a surface of the display screen (handled as a point in the same coordinate system as that of a touch position) is detected as a proximity position. In this exemplary embodiment, the touch and proximity detection processes may be performed based on an electrostatic capacitance method.

However, a touch panel supporting a resistive film scheme, an infrared radiation scheme, an ultrasonic method, an acoustic wave scheme, wave detection scheme or the like may be utilized instead. Alternatively, one such as a range image sensor and a stereo camera which is capable of detecting a position in a three-dimensional space may be used to detect whether an input target plane has been touched or not and acquire position information defined on the input target plane. Though the touch position or proximity position is detected as one coordinate point in this exemplary embodiment, an embodiment of the present invention is not limited thereto. A contact part having an area may be regarded as a touch position or a proximity position. For example, a display screen may be divided into arrays of detection regions, and identification information describing which of the regions has been detected as "touch" or "proximity" may be handled as the position information. The bus 101 is a system bus configured to connect the CPU 102, ROM 103, RAM 104, rendering unit 105 and touch panel display 106.

Figure 2:
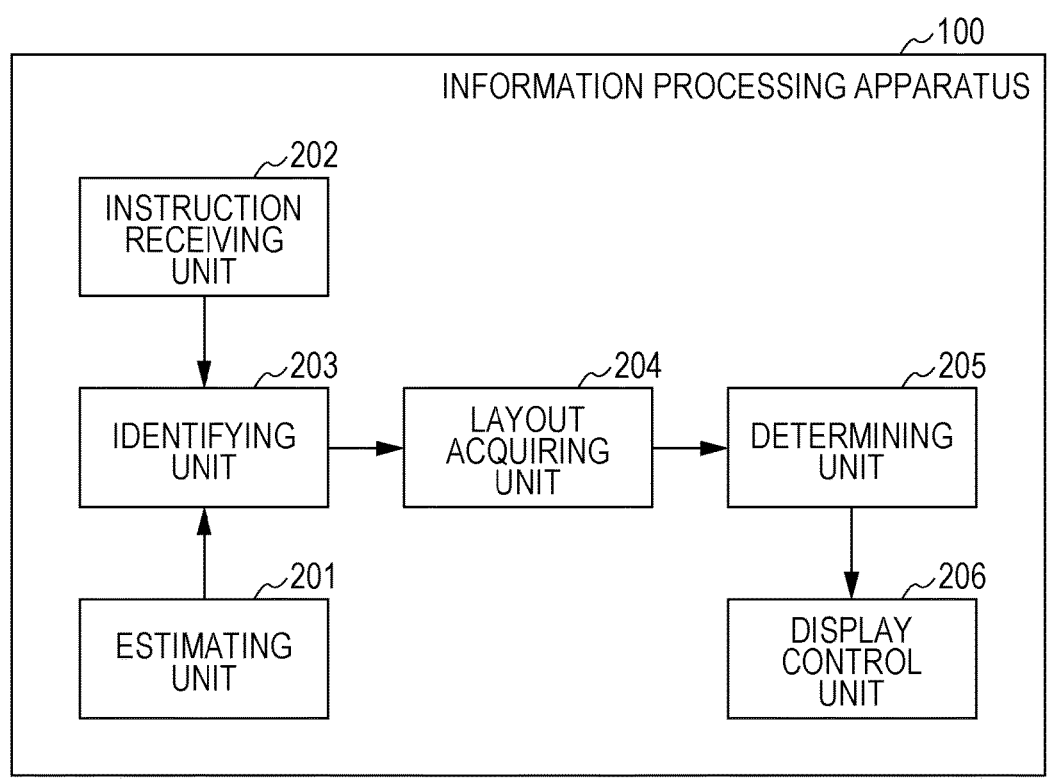
FIG. 2 is a block diagram illustrating an example of a functional configuration of an information processing apparatus according to a first embodiment.

Next, a flow of processing of an information processing apparatus to which the present invention is applied will be described with reference to a block diagram illustrating a functional configuration in FIG. 2 and a flowchart illustrated in FIG. 3. As illustrated in FIG. 2, the information processing apparatus 100 according to this exemplary embodiment includes an estimating unit 201, an instruction receiving unit 202, an identifying unit 203, a component layout acquiring unit 204, a moving amount determining unit 205, and a display control unit 206. According to this exemplary embodiment, the CPU 102 decompresses and executes, in the RAM 104, programs stored in the ROM 103 so that those functional units may implement their functions. However, the present invention may also be implemented by an information processing apparatus which implements those functional units by hardware. In this case, computing units and circuits corresponding to the processes of the functional units may be provided.

Figure 3:
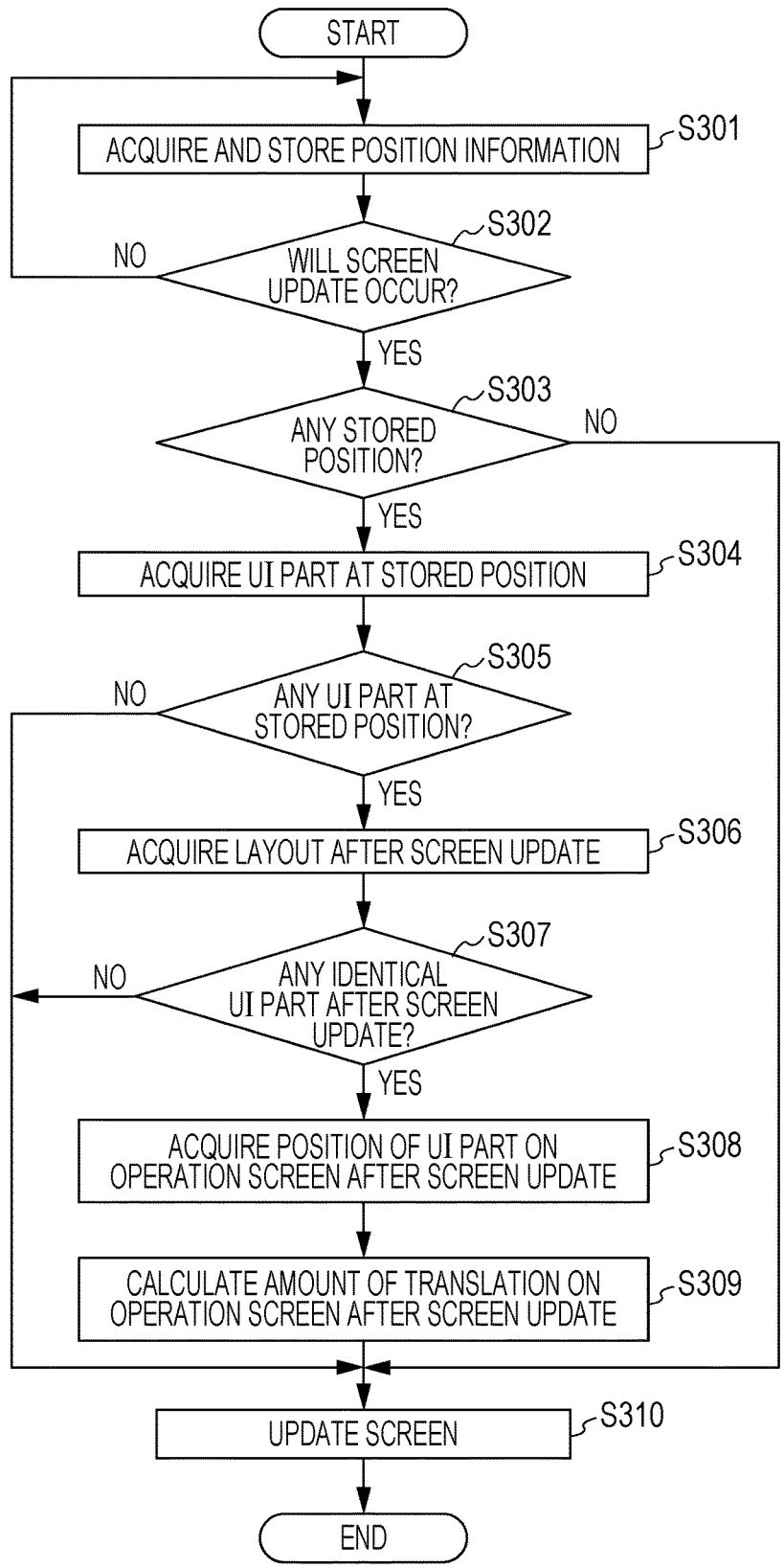
FIG. 3 is a flowchart illustrating a flow of processing in the information processing apparatus according to the first exemplary embodiment.

FIG. 3 illustrates a main flow of operation recognition processing to be executed by the information processing apparatus 100 of this exemplary embodiment. This processing starts from a state that an object is located and is displayed on a display with a touch panel. An object assumed in this exemplary embodiment is a user interface component (UI) which configures a graphical user interface (GUI) and issues a preset command when it is touched. It is assumed that UIs are located according to a layout as illustrated in FIG. 5A on an operation screen at the time when the processing starts. FIG. 5B illustrates how they are displayed on a screen of a display 501 with a touch panel.

First, the estimating unit 201 estimates a position on the touch panel which is estimated to be designated by a user based on position information detected by the touch panel display 106 and stores the information onto the RAM 104 (step S301). An electrostatic touch panel corresponding to the touch panel display 106 of this exemplary embodiment is capable of detecting a proximity position of an object that is close to some extent on a touch panel based on an amount of change in capacitance. The detected proximity position is estimated as a position estimated to be designated by a user. This process estimates a position of a user's fingertip detected by a sensor as a position to be designated by a user irrespective of whether the user actually intends to touch the position or not. When moving proximity positions are being detected while a user is bringing his/her fingertip close to the touch panel to perform a touch operation, for example, the latest proximity position is always regarded as a position to be designated by a user. This estimation according to this exemplary embodiment is performed before an operation is actually performed so that an effect of the operation may be acquired immediately when the operation is actually performed. Hereinafter, the "position estimated to be designated by a user" according to this exemplary embodiment will be called a target position. In this exemplary embodiment, the coordinates on a touch panel of a point having a largest amount of change in capacitance are acquired. However, in a case where a proximity position of an object is not detected because the object is off a detectable range, a value indicative of a state that an object is not detected (hereinafter, called "not-detected") is stored. A value indicative of "not-detected" may be a null value or a coordinate value not present on the touch panel, for example. Here, the method for representing the value indicative of "non-detected" is not limited.

Next, the instruction receiving unit 202 checks whether a screen update has been instructed or not (step S302). The term "screen update" according to this exemplary embodiment refers to an update that occurs when a content of one image is changed during steps of forming and displaying the image in stepwise manner in response to a received instruction. The formed image may include a plurality of contents, and at least a part of the image formed until then is updated every screen update. For example, a Web browser application may render data while acquiring the data over the Internet, and a plurality of screen updates may occur until the data acquisition completes. Due to some script processing included in acquired data, a process for changing the image within a display screen may result in a screen update, for example. Displaying a pop-up screen in response to an interrupt request from a system or an application is also an example of the screen update. A screen update which may increase or decrease contents included in a displayed image may sometimes change the display position of the contents included in the image before the update. According to this exemplary embodiment, a position intended to be designated by a user is estimated, and the display position of an object having a higher possibility of being designated is controlled so as to be located at the same position while the display image is being formed in stepwise manner to reduce erroneous operations. The term "designate" here refers to an operation for issuing a command associated with a user interface component by a touch operation, for example, and causing the information processing apparatus 100 to execute a process corresponding to the command. If there is no screen update instruction in step S302, the processing returns to step S301 where a position estimated to be designated by a user is determined and the determined value or a value indicative of "not detected" is stored.

If there is a screen update instruction in step S302, whether information on the target position stored in step S301 exists or not is checked (step S303). If the position information is stored rather than the value indicative of "not detected", the identifying unit 203 acquires an object placed at the position on an operation screen before a screen update (step S304). It is assumed here that the coordinates of the stored position are (60,50). FIG. 5C illustrates a relationship between stored positions and the display screen. A position 505 is within a button B 503, and the object acquired in step S304 corresponds to the button B 503. Because a position 507 (coordinates (60,35)) in FIG. 5C does not exist on any objects, the object acquired in step S304 does not exist.

Next, whether the object exists at the target position or not is determined (step S305). If so, the component layout acquiring unit 204 acquires layout information of an operation screen after the screen update (step S306). The layout information may include information on a region excluding the display range of the operation screen. FIG. 5D illustrates layout information on the operation screen after the screen update. In FIG. 5D, an image 506 is arranged on a button A 502, and a button C 504 is arranged below the X axis, that is, a negative side of the Y coordinate. Next, in step S304, whether the acquired object is included in the layout information on the operation screen after the screen update or not is determined (step S307). Referring to FIG. 5D, because a button B 503 is included in the layout information on the operation screen after the screen update, the component layout acquiring unit 204 next acquires the layout information of the button B 503 on the operation screen after the screen update (step S308). Referring to FIG. 5D, the acquired layout information describes that the button B 503 is a rectangle having a lower left point at coordinates (10,10) and having a width of 60 and a height of 20. If the layout information on the operation screen after the screen update which is acquired in step S306 does not include the button B 503, as illustrated in FIG. 6B, it is determined in step S307 that no object exists after the screen update.

Next, the moving amount determining unit 205 determines the amount of translation based on the layout information of the object acquired in step S308 such that the object acquired in step S304 overlaps the target position acquired in step S301 (step S309). The process in step S309 where the amount of translation is determined such that the center of an object may overlap the target position stored in step S301 will be described with reference to the flowchart illustrated in FIG. 4A. From the layout information of the button B 503, the center of the button B 503 on the operation screen after the screen update is calculated (step S401). Referring to FIG. 5C, the coordinates of the center of the button B 503 are acquired as (40,20). Next, the vector from the coordinates of the center point of the button B 503 to the coordinates of the position 505 is calculated (step S402). The vector (20,30) is acquired, and this is the amount of translation. However, a predetermined amount of movement corresponding to the positional relationship between an object and a proximity position may be determined with reference to a look-up table prepared in advance, without performing the calculation process.

The display control unit 206 generates the operation screen after the screen update by translating the object based on the amount of translation acquired in step S309, and the screen update is executed (step S310). FIG. 5E illustrates the operation screen to be displayed on the screen after the screen update. After the screen update completes, if a touch input is detected on the touch panel display 106, a process according to the object displayed at the touched position is executed. In this way, according to this exemplary embodiment, after the time when it is detected that user's finger is being brought close to an object, the proximity position is regarded as a position to be designated by a user to control the position of the object. Thus, a touch operation along a user's intention may be recognized. In other words, a screen is updated while controlling such that an object located at a position estimated to be designated by a user may be displayed at an identical position before and after the update. Thus, when the timing of a display update and the timing of a user's input operation occur simultaneously, the display layout after the display update may be kept, which may reduce erroneous operations. Alternatively, the information processing apparatus 100 may have a mode in which a screen update is performed by fixing an object displayed at a position to be designated by a user and a mode which does not fix the object, and a user may be allowed to select one of the modes arbitrarily. It may be set to select one of the modes in accordance with the application. A Web page, for example, may be described so as to inhibit control for fixing a position of an object in a browser.

Having described up to this point the process in step S309 with respect to the method for calculating an amount of translation to allow the center of an object to overlap a target position stored in step S301, an alternative method may be used for overlapping of an object with a target position. A variation example will be described with reference to the flowchart in FIG. 4B. In the example, the amount of translation may be calculated in consideration of a correlation between an object on an operation screen before a screen update and a target position estimated to be designated by a user. A case will be described below in which the target position estimated to be designated is the position 505 (60,50) illustrated in FIG. 5C and the object is the button B 503. First of all, as a positional correlation between the object on an operation screen before a screen update and the target position estimated to be designated, a vector from lower left coordinates (coordinates closest to the origin) of the object to the target position is acquired (step S403). Because the lower left coordinates of the button B 503 are (10,40) based on the layout information of the operation screen before a screen update illustrated in FIG. 5A, the vector is acquired as (50,10). Next, a point P is acquired by adding the vector acquired in step S403 to the lower left coordinates of the button B 503 based on the layout information of the button B 503 on the operation screen after the screen update (step S404). Because the lower left coordinates of the button B 503 after the screen update are (10,10) with reference to FIG. 5D, the point P has coordinates (60,20). Next, the amount of movement is acquired as a vector from the point P to the position 505 (step S405). The vector from the point P to the position 505 is (0,30). The amount of movement is applied to generate the operation screen after the screen update in step S310. FIG. 5F illustrates the result after the screen update. Having used coordinates as the positional correlation above for explanation, it may be configured that the target position may be calculated by using proportions against the height and width of an object. Thus, this embodiment of the present invention is also applicable even when the height and/or width of an object is/are changed after a screen update.

If the information stored in step S303 is a value indicative of "not detected", an operation screen after a screen update is generated in step S310 without applying the translation process, and then the screen update is performed. FIG. 6A illustrates an operation screen to be displayed on a screen after the screen update. Because the translation process is not applied, the operation screen is displayed on the screen based on the layout information illustrated in FIG. 5D. If the object acquired in step S304 does not have the target position at the position 507 in FIG. 5C, it is determined in step S305 that no object exists. In step S310, an operation screen after the update is also generated, and the screen update is performed. The operation screen displayed on the screen after the update is also as illustrated in FIG. 6A. If the layout information on the operation screen after the screen update acquired in step S306 does not have the object acquired in step S304, an image after the screen update is generated and the screen update is performed in step S310 by skipping the processes in steps S308 and S309. If the layout information illustrated in FIG. 6B is acquired in step S306, the operation screen displayed on the screen after the screen update is as illustrated in FIG. 6C. Alternatively, the object may be rearranged to avoid overlapping with the target position stored in step S301, as illustrated in FIG. 6F.

In the example above, when an object on an operation screen before a screen update, which exists at the target position stored in step S301, is acquired in step S304, whether the target position is within the object or not is determined. However, the object closest to the target position may be acquired. For example, it may be configured such that the button B 503 which exists not within any object but at the position 601 in FIG. 6D, for example, may be acquired as the closest object to the position 601. It may further be configured such that a predetermined threshold value may be set, and an object closest to a target position within a range indicated by the threshold value may be acquired. Alternatively, instead of the determination based on whether the position is within the object or not, a region may be set which contains the object and having a larger area than that of the object, and whether the object is within the region or not may be determined. For example, as illustrated in FIG. 6E, a button A determination region 602, a button B determination region 603, and a button C determination region 604 may be set for the button A 502, button B 503, and button C 504, respectively. Because the position 601 is contained within the button B determination region 603, the button B 503 is acquired in step S304.

Figure 4A:
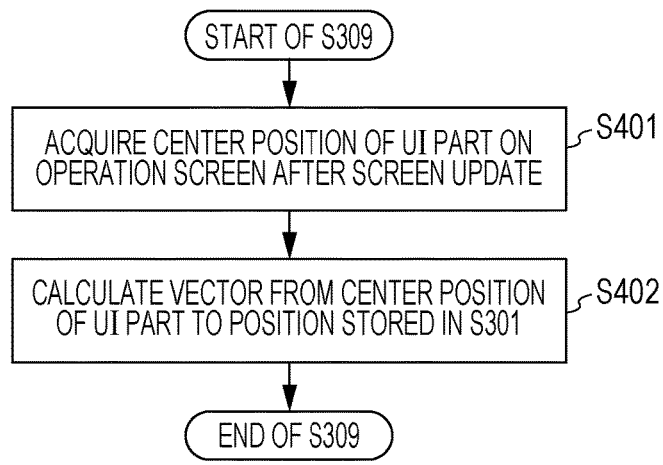
FIGS. 4A to 4C are flowcharts illustrating flows of processing in the information processing apparatus according to the first exemplary embodiment.
Figure 4B:
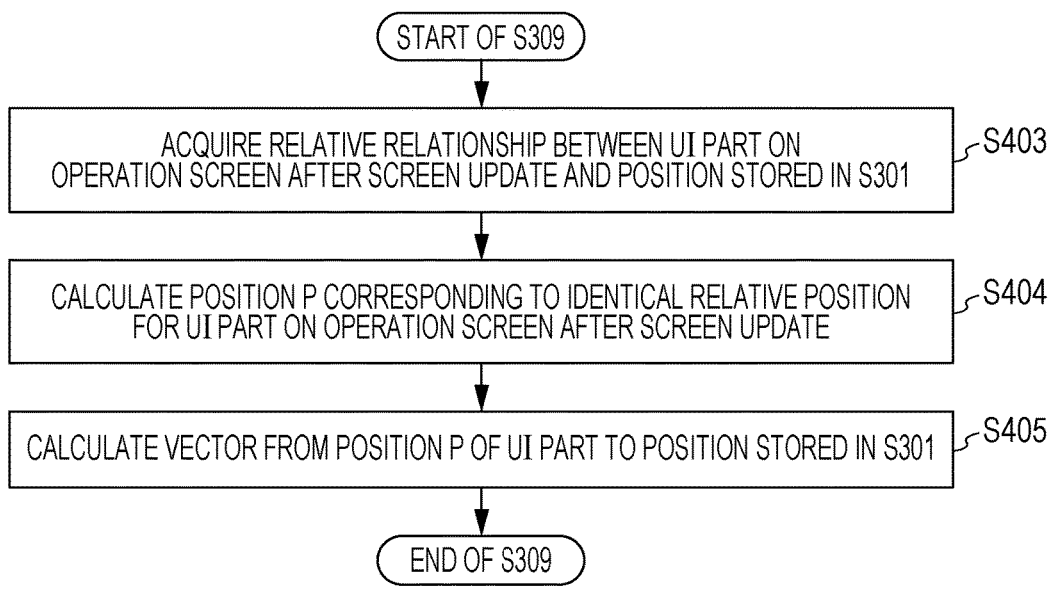
Figure 4C:
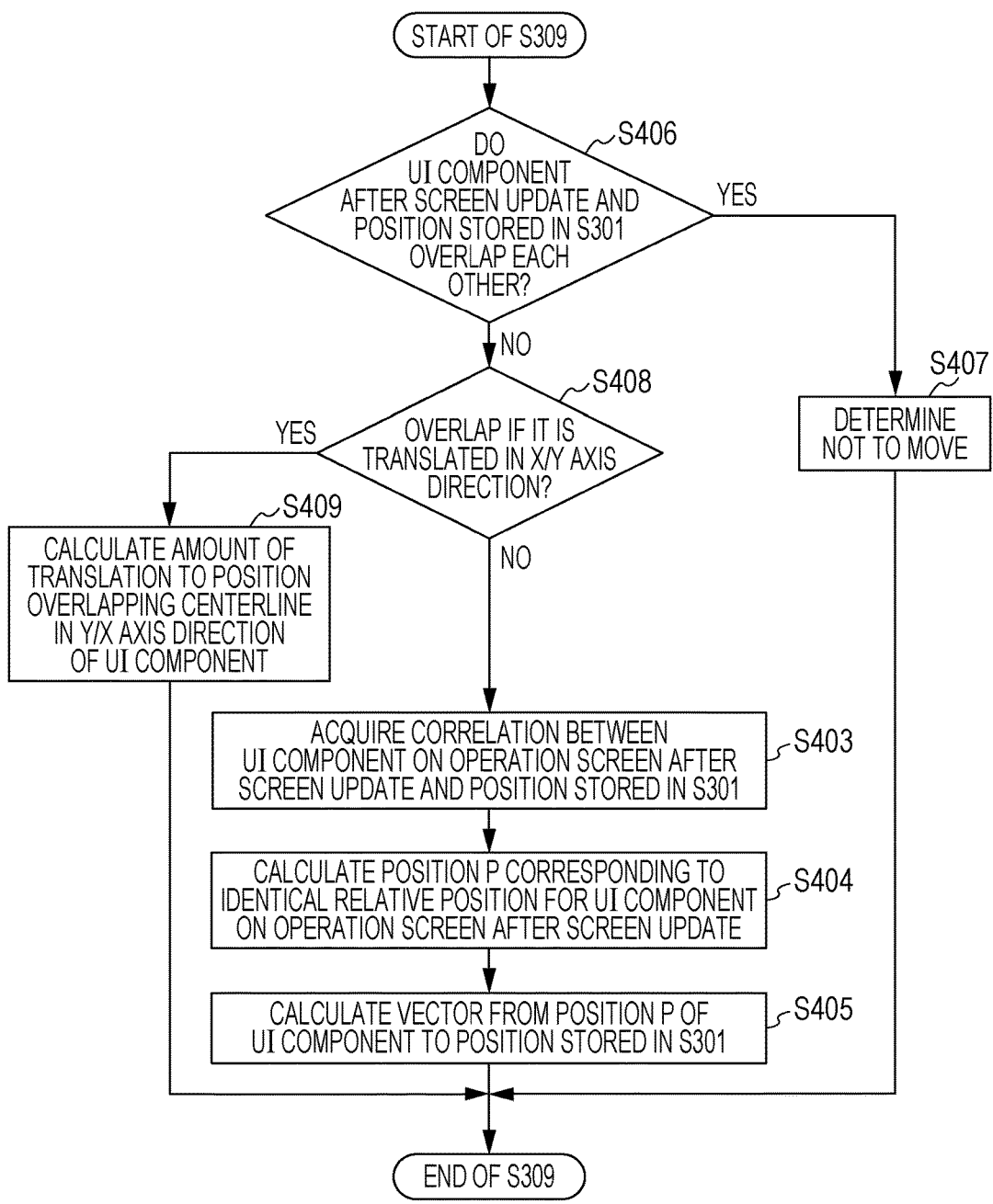

This exemplary embodiment is also adaptive to a mobile terminal capable of detecting a direction of gravity and switching its display by using a combination of the orientation of the mobile terminal and the direction of gravity because such display switching is also an example of the screen update. An example will be described in which the layout of an operation screen is changed by a screen update from a portrait layout to a landscape layout. Cases occurring when an operation screen as illustrated in FIG. 7A is displayed will be described in which the target position stored in step S301 is a position 701 having coordinates (14,44) and in which the target position is a position 702 having coordinates (40,50). FIG. 7B illustrates layout information of an operation screen after a screen update, which is acquired in step S306, when a change in relationship between the direction of gravity and the orientation of a display with a touch panel changes the layout of the operation screen. According to this exemplary embodiment, because the vertical direction of an object is matched with the perpendicular direction of the display whose orientation has been changed, the width of the object and so on may be changed. Also in this case, according to this exemplary embodiment, the screen display position after a screen update of an object displayed at the target position is controlled such that the object may be identical before and after the screen update. When the target position is the position 701 or position 702, the object acquired in step S304 is the button B 503. Referring to FIG. 7B, it is determined in step S307 that the button B 503 exists in the layout of the operation screen after the screen update, and the layout information of the button B 503 is acquired in step S308. Next, in step S309, the amount of translation is determined. The process in step S309 may calculate and determine the amount of movement which allows the overlap of the center of the object and the target position as illustrated in FIG. 4A. The calculation may be performed in consideration of the positional correlation between the object and the target position, as illustrated in FIG. 4B. An alternative process which calculates an axial translation by priority will be described below. FIG. 4C is a flowchart describing the process in step S309 in FIG. 3 in which an axial translation is given priority. First of all, whether the target position stored in step S301 and the object after a screen update overlap each other or not is determined (step S406). If so, the object does not have to be moved. Therefore, the moving amount determining unit 205 determines no amount of movement (step S407), and the process in step S309 ends. If not in step S406, whether the object may overlap the target position by being translated axially is determined (step S408). If so, the amount of axial translation is calculated (step S409). If it is determined that they are overlapped by translating the object in the X axis direction, the amount of translation in the X axis direction is calculated for overlap of the centerline in the Y axis direction of the object and the target position. If it is determined that they are overlapped by translating the object in the Y axis direction, the amount of translation in the Y axis direction is calculated for overlap of the centerline in the X axis direction of the object and the target position. If it is determined in step S408 that the overlap may not be acquired even by translating the object in either axis direction, the processing illustrated in FIG. 4B is performed, and the process in step S309 ends. According to the layout of the position 701 and the operation screen after a screen update illustrated in FIGS. 7A and 7B, the button B 503 and the position 701 do not overlap after the screen update, and the button B 503 is translated in a negative direction of the X axis for the overlap. In this case, the process in step S409 is performed. More specifically, the centerline in the Y axis direction of the button B 503 is calculated based on the layout information after a screen update. Because the center in the Y axis direction of the button B 503 satisfies X=40, the amount of translation for overlap with the position 701 (14, 44) is acquired as (−26,0). FIG. 7D illustrates the overlapping operation screen and target position step displayed as a result of the screen update in S310. On the other hand, because the region after the screen update of the button B 503 overlaps the position 702, step S407 calculates as no amount of movement. In this case, the overlapping operation screen and target position as a result of the screen update in step S310 is displayed as illustrated FIG. 7C. They are displayed along the layout illustrated in FIG. 7B. According to this exemplary embodiment, also with a screen update which changes the orientation and width of an object in response to a change of the orientation of the display, the object displayed at a target position estimated to be designated by a user before the update may be displayed at the identical position also after the update. The expression "object . . . displayed at the identical position" here refers to a state that an identical object to the one displayed before an update is displayed at the estimated position. In other words, whether or not the agreement of the orientation and size of the object, the state corresponds to a state allowing input of an operation on one identical object before and after an update when the position is touched.

Some applications for recognizing a touch operation may identify a position where a finger or a pen is moved off a touch panel (touched-up position) and start processing an object present at the position. In this case, a position where a touch is started (touched-down position) may be regarded as a target position and be stored in step S301. In this case, the aforementioned processes are executed in response to a screen update occurring during a period from the touch-down until a finger or a pen is moved off (until the panel is touched up). Thus, it may be controlled such that an object displayed at the position estimated to be designated may be displayed at the identical position also after the update. Therefore, erroneous operations may be reduced advantageously.

The present invention is also applicable to other input/output devices than a display with an electrostatic touch panel according to this exemplary embodiment. For example, the present invention is also applicable to a case where a user moves an operation indicator such as a mouse cursor on a display screen displaying an operation screen and performs a click operation to execute a process on an object at a position with the operation indicator. In other words, the estimating unit 201 acquires and stores the display position of the mouse cursor as the target position estimated to be designated by the user (step S301). By performing the processes in step S302 to step S310, an object at the position with the mouse cursor before a screen update is also arranged at the position with the mouse cursor also after the screen update. Alternatively, the line of sight of a user may be detected, and a point gazed by the user may be defined as the target position and be acquired in step S301.

Implementation of the aforementioned process control may allow an object to be designated by a user before a screen update to exist at a position estimated to be designated by the user also after the screen update even if any. Thus, erroneous operations may be reduced.

Second Exemplary Embodiment

According to the first exemplary embodiment, it has been described how display of an operation screen is to be controlled based on a single object overlapping or close to a position estimated to be designated by a user. According to a second exemplary embodiment, it will be described how display of an operation screen is to be controlled based on a plurality of objects close to a position estimated to be designated by a user.

Figure 8:
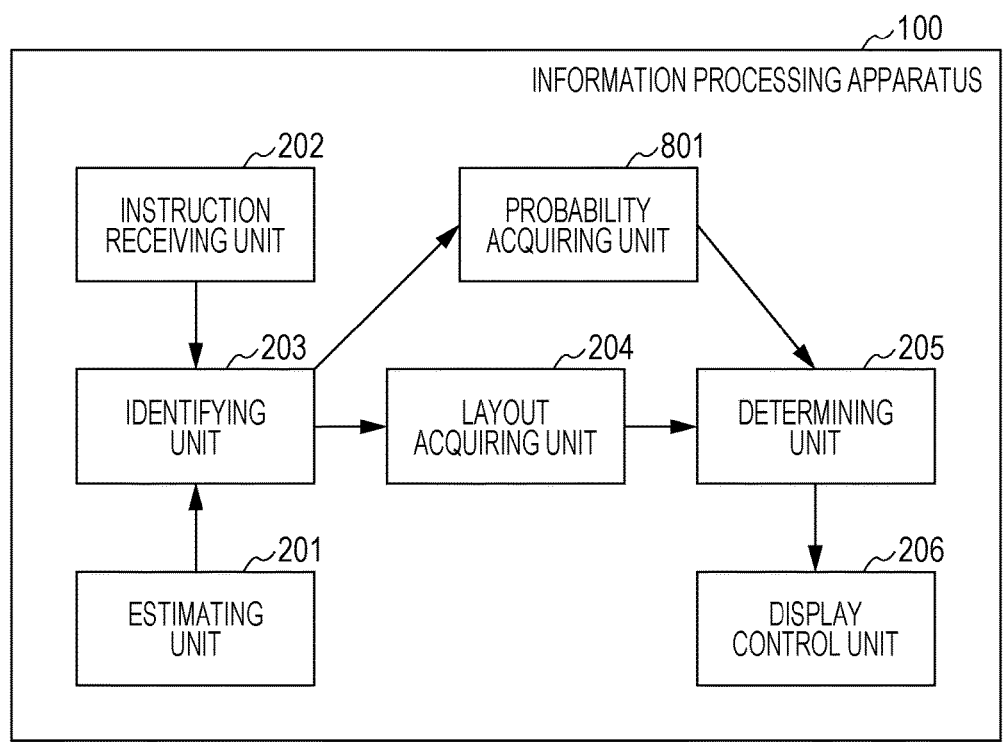
FIG. 8 is a block diagram illustrating an example of a functional configuration of an information processing apparatus according to a second exemplary embodiment.
Figure 9:
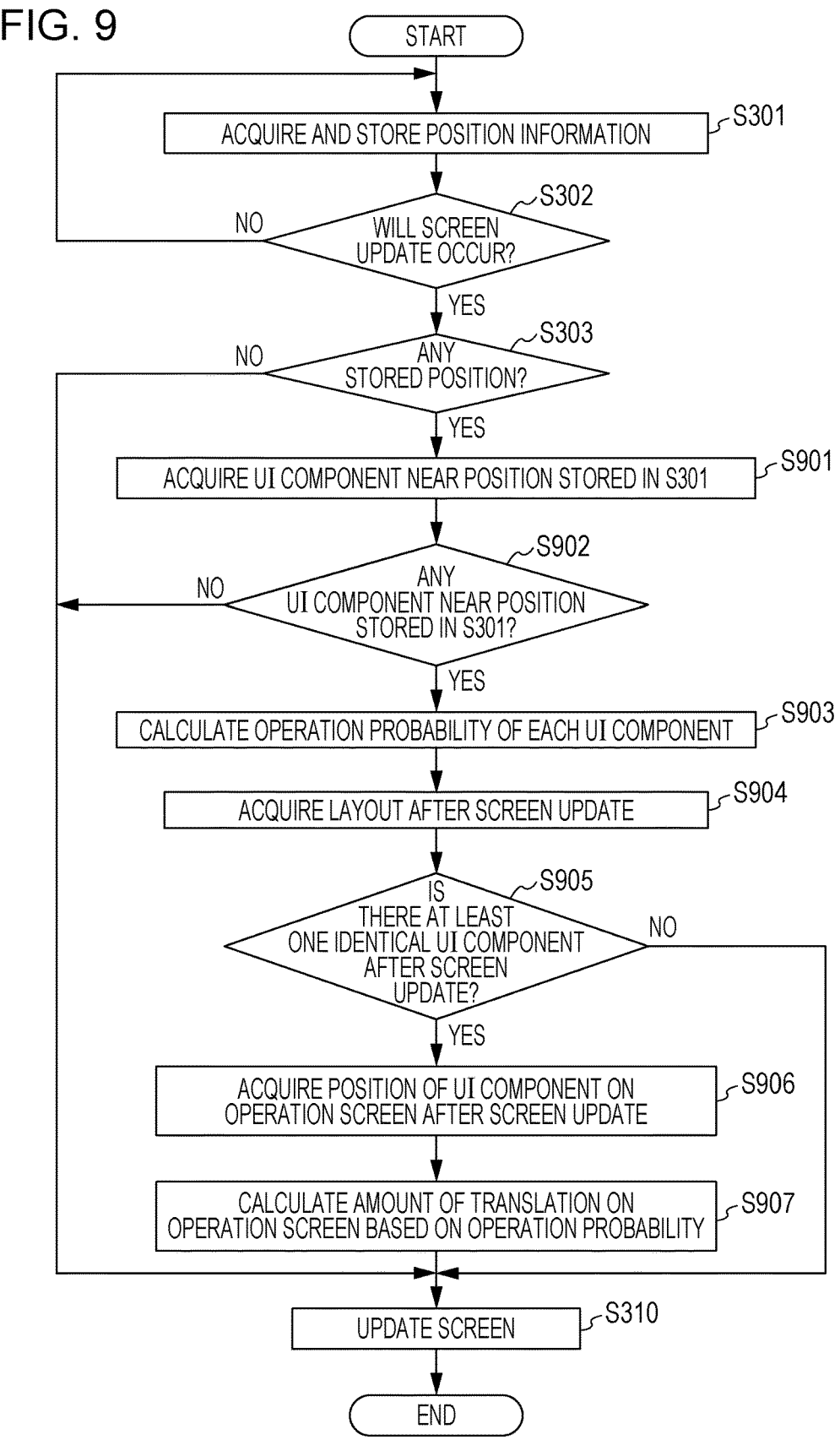
FIG. 9 is a flowchart illustrating a flow of processing in the information processing apparatus according to the second exemplary embodiment.

Because the hardware configuration of a display control system according to the second exemplary embodiment is the same as that of the first exemplary embodiment, the description will be omitted. FIG. 8 is a block diagram illustrating a functional configuration of the second exemplary embodiment, and FIG. 9 illustrates a flowchart illustrating a processing flow. The block diagram in FIG. 8 is different from FIG. 2 in that a probability acquiring unit 801 is further provided. The probability acquiring unit 801 acquires indices indicative of which component is to be operated in order to identify a component to be controlled by priority among one or more objects close to a proximity position such that the display position of the component may not be displaced. According to this exemplary embodiment, the probability acquiring unit 801 calculates a non-operation probability.

Figure 10A:
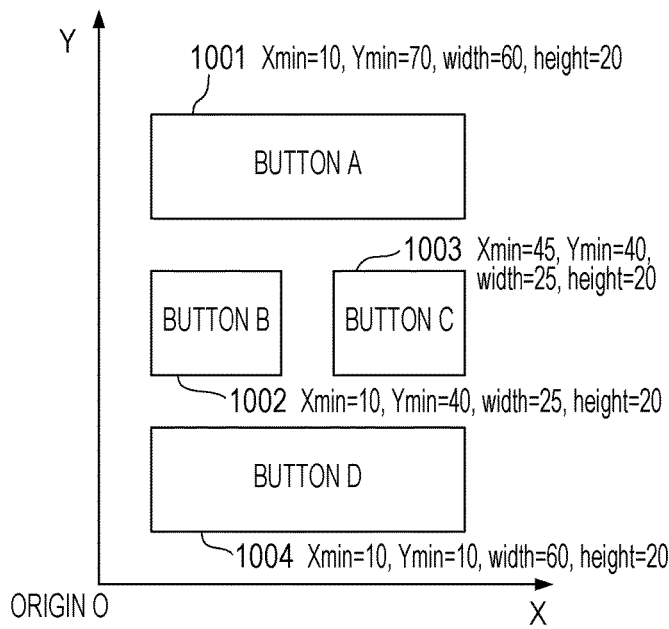
FIGS. 10A to 10D are schematic diagrams illustrating details of processing in the information processing apparatus according to the second exemplary embodiment.
Figure 10B:
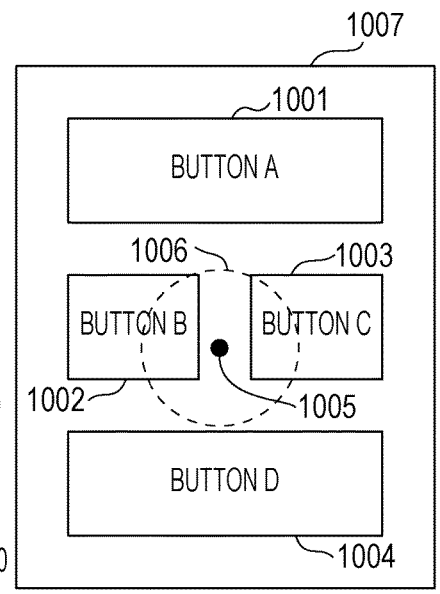

Because steps S301 to step S303 are the same as the corresponding details according to the first exemplary embodiment, the description will be omitted. The information stored in step S303 is a value indicative of "not detected", a screen update is performed in step S310 in the same manner as described according to the first exemplary embodiment, and the processing ends. It is assumed here that the stored information is coordinates (39,46) of a target position. FIG. 10A is a schematic diagram illustrating layout information of an operation screen before a screen update. If coordinates of a target position are stored in step S303 instead of a value indicative of "not detected", the identifying unit 203 acquires an object including the target position stored within a predetermined range (step S901). Whether any object exists closely to the position or not is then determined (step S902). FIG. 10B is a schematic diagram illustrating a relationship between how an operation screen is being displayed and a stored target position. If the predetermined range including the target position is a range displayed on a display 1007 and is a circle having a radius of 15 and the target position as its center, the predetermined range may be an object acquisition range 1006 in FIG. 10B. The objects overlapping the object acquisition range 1006 are a button B 1002, and a button C 1003, and a button A 1001 and a button D 1004 are not included in the range. If no object is included within the object acquisition range, a screen update is performed in step S310, and the processing ends. If an object is included within the object acquisition range, the probability acquiring unit 801 acquires a non-operation probability of the acquired object (step S903). The term "non-operation probability" refers to a probability that a target UI component will be is touched after the present time and is an example of an index usable for controlling the display position of the component that is most likely touched by priority. Here, the inverse ratios of the shortest distances from the position 1005 to the components are calculated to acquire values to be handled as the non-operation probabilities. Referring to FIGS. 10A and 10B, the shortest distance from the position 1005 to the button B 1002 is equal to 4, and the shortest distance from the position 1005 to the button C 1003 is equal to 6. Therefore, the non-operation probability of the button B 1002 is equal to 60%, and the non-operation probability of the button C 1003 is equal to 40%.

Figure 10C:
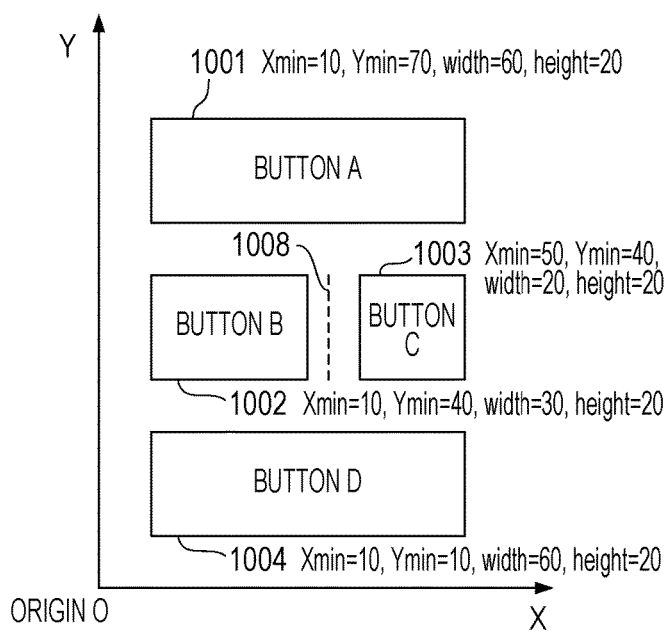

Next, layout information of the operation screen after the screen update is acquired (step S904). FIG. 10C is a schematic diagram illustrating an example of the layout information acquired here. The widths of the button B 1002 and button C 1003 are changed. Next, whether the layout information of the operation screen after the screen update contains the object acquired in step S901 is determined (step S905). If not, the screen update is performed in step S310, and the processing ends. In this example, because the button B 1002 and button C 1003 are both contained in the layout information, the corresponding layout information is acquired (step S906). Next, the amount of movement of the operation screen after the screen update is calculated based on the non-operation probabilities in step S903 (step S907).

Figure 10D:
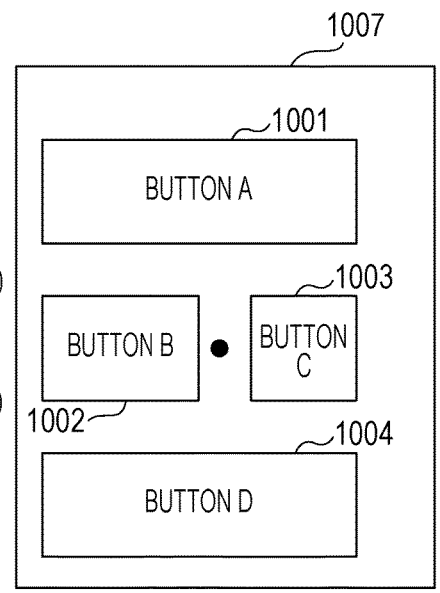

The process in step S907 will be described in detail. A set of points at the shortest distances from an outline of the button B 1002 and an outline of the button C 1003 are acquired. In this case, the shortest distances are inverse ration of the non-operation probabilities of the objects. The set of points are indicated by a dividing line 1008 in FIG. 10C. The dividing line 1008 is acquired as a segment from the coordinates (44,40) to the coordinates (44,60). Next, a vector from a midpoint (44,50) of the dividing line 1008 to the position 1005 (39,46) is calculated. The vector is calculated as (−5,−4), and an operation screen after a screen update is generated by applying the vector as the amount of movement. When the screen update is executed, the operation screen is acquired as illustrated in FIG. 10D.

Having described above an information processing method including calculating non-operation probabilities of two objects and applying the amount of movement based on it, the amount of movement may be acquired from non-operation probabilities of three or more objects. If it is determined in step S905 that all of objects acquired in step S901 are not included in the layout information of the operation screen after a screen update, the amount of movement may be calculated only from objects included in the layout information of the operation screen after a screen update. If the objects acquired in step S901 are spaced apart by a predetermined value in the layout information of the operation screen after a screen update, it may be configured to process with no amount of movement.

Performing the aforementioned process control allows a plurality of objects having existed closely to positions to be designated by a user before a screen update occurs to be displayed near the positions also after the screen update even when those objects are estimated to be designated immediately before the screen update. Therefore, erroneous operations may be reduced. Because the distances to the position of an object after a screen update decreases as the possibility of being designated increases, erroneous operations may further be reduced.

Third Exemplary Embodiment

According to the first exemplary embodiment and second exemplary embodiment, one process is to be executed by designating any position within a display region of an object such as a button. According to a third exemplary embodiment, a method for controlling display of an operation screen will be described in a case where different processes are to be executed in accordance with the positions where a target object is designated.

Figure 11:
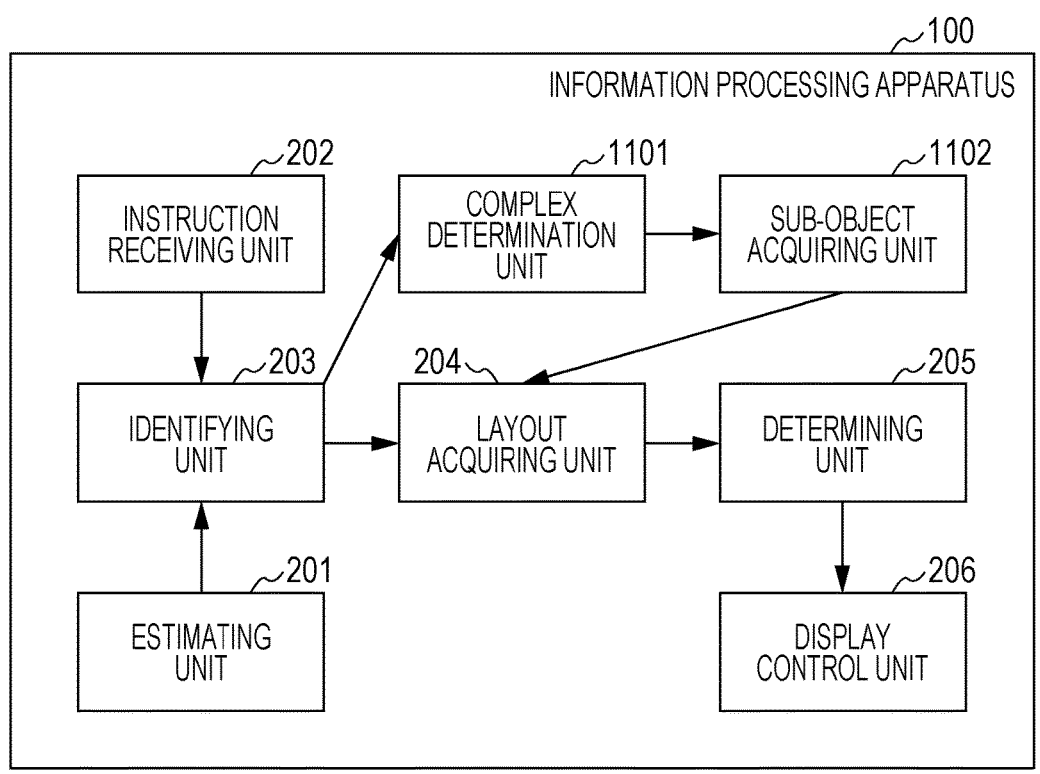
FIG. 11 is a block diagram illustrating an example of a functional configuration of an information processing apparatus according to third exemplary embodiment.
Figure 12:
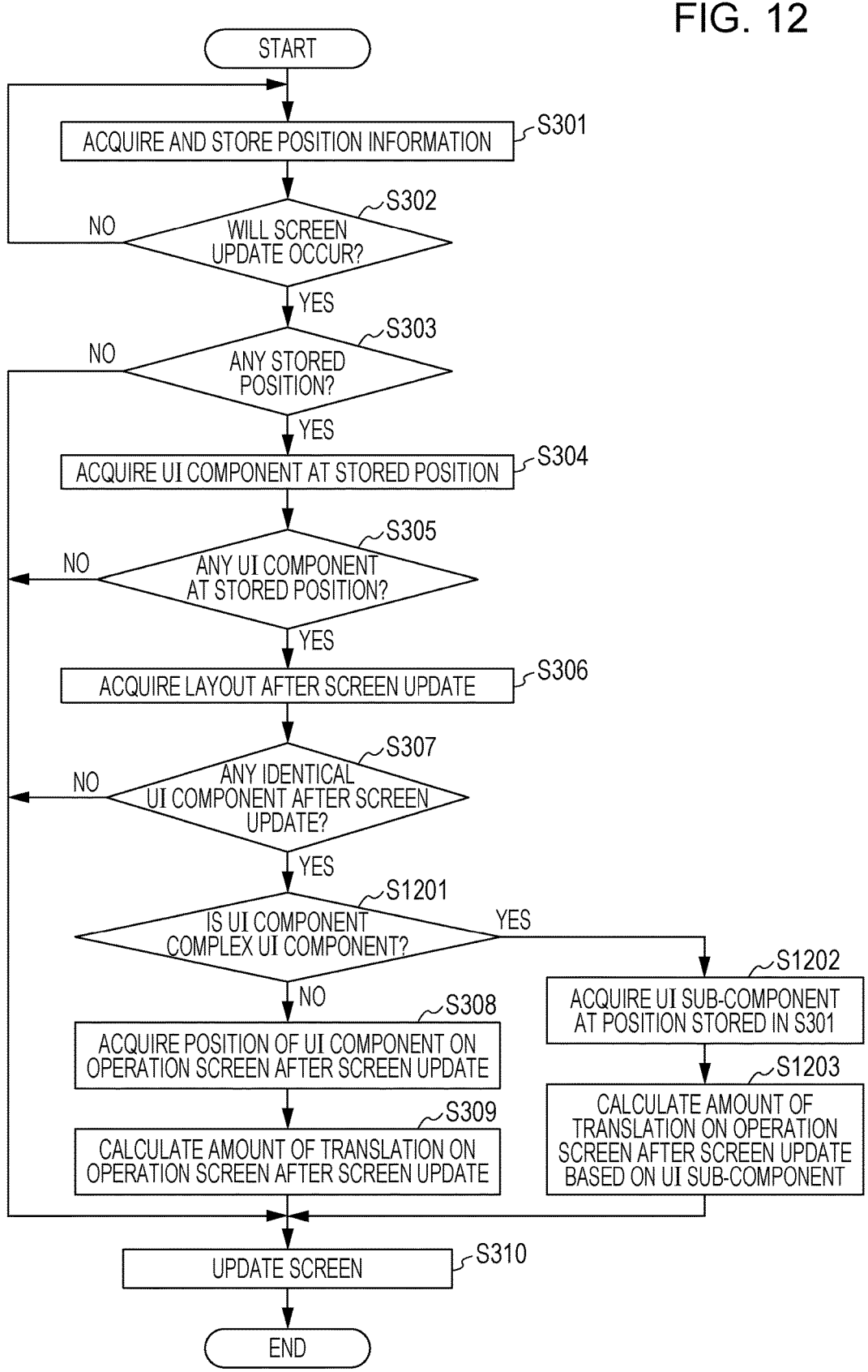
FIG. 12 is a flowchart illustrating a flow of processing in the information processing apparatus according to the third exemplary embodiment.

Because the hardware configuration of a display control system according to the third exemplary embodiment is the same as that of the first exemplary embodiment, the description will be omitted. FIG. 11 is a block diagram illustrating a functional configuration according to the third exemplary embodiment, and FIG. 12 is a flowchart illustrating a processing flow. FIG. 11 is different from FIG. 2 in that a complex object determination unit 1101 and a sub-object acquiring unit 1102 are further provided. The complex object determination unit 1101 is configured to determine whether an object existing at a target position estimated to be designated by a user is a complex object or not. The term "complex object" in this exemplary embodiment refers to a user interface component which may be one display object capable of accepting commands to instruct different processes based on the designated positions within a display region of the object. The sub-object acquiring unit 1102 is configured to acquire a user interface components (each of which corresponds to one command) serving as elements included in a complex object.

Figure 13A:
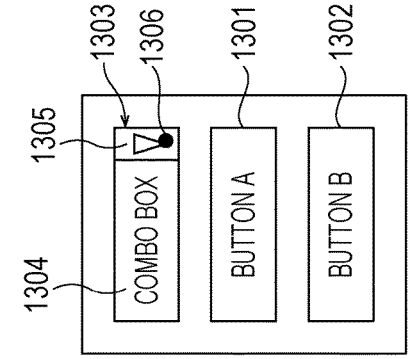
FIGS. 13A to 13D are schematic diagrams illustrating details of processing in the information processing apparatus according to the third exemplary embodiment.

It is assumed that the layout of an operation screen before a screen update is as illustrated in FIG. 13A. Each of a button A 1301 and a button B 1302 is an object for executing one process even when any position within a corresponding region is designated. A combo box 1303 includes a text box 1304 and a drop-down button 1305. When a region of the text box 1304 is designated, a text editing mode is activated. When the drop-down button 1305 is designated, a drop-down menu is displayed. According to this exemplary embodiment, an object for executing different processes in accordance with the designated positions is defined as a complex object. The complex objects may further include a spin button and a slider, for example. An object included in a complex object is defined as a sub-object. For example, the text box 1304 and the drop-down button 1305 are sub-objects of the combo box 1303.

Figure 13B:
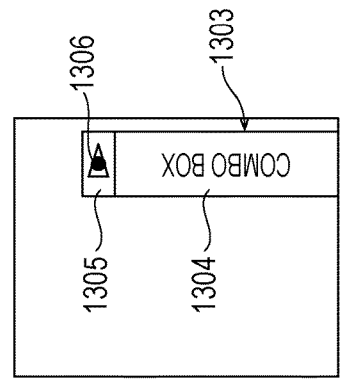
Figure 13C:
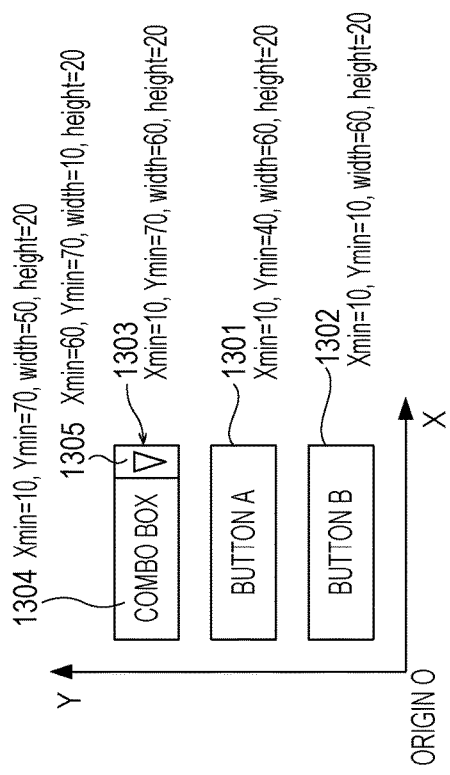

Referring to FIG. 12, because steps S301 to step S307 are the same as the corresponding details according to the first exemplary embodiment, the description will be omitted. It is assumed that the coordinates of a target position acquired and stored in step S301 are (66,74). FIG. 13B is a schematic diagram illustrating the target position over an operation screen before a screen update, which is displayed on a screen. In step S305, because a position 1306 and a combo box 1303 overlap each other, it is determined that an object exists at the target position. FIG. 13C illustrates a layout of an operation screen after the screen update, which is acquired in step S306. Because the combo box 1303 exists in the layout of the operation screen after the screen update, it is determined in step S307 that the identical object exists after the screen update.

Figure 13D:
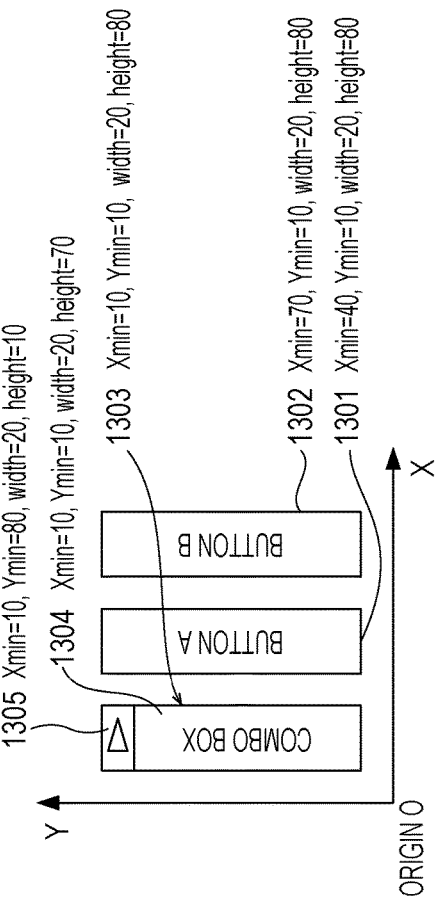

Next, the complex object determination unit 1101 determines whether the object that exists at the target position before the screen update is a complex object or not (step S1201). The determination of a complex object may refer to a list of types each of which indicates a complex object or not and is registered in advance with the list or may be implemented by other methods. If the object is not a complex object, the processes in steps S308 and S309 according to the first exemplary embodiment are executed, and an operation screen after the screen update is generated by applying the calculated amount of movement. Then, the screen update is executed, and the processing ends. If the object is a complex object, the sub-object acquiring unit 1102 acquires a sub-object that exists at the target position (step S1202). Referring to FIG. 13B, the sub-object acquired in step S1202 is the drop-down button 1305. Next, the moving amount determining unit 205 calculates the amount of movement of the operation screen after the screen update based on the sub-object acquired in step S1202 (step S1203). In this case, the amount of translation of the operation screen after the screen update is calculated where the center of the sub-object acquired in step S1202 is matched with the target position. The coordinates of the center of the drop-down button 1305 on the operation screen after the screen update are (20,85). Because the coordinates of the position 1306 are (66,74), the amount of translation is calculated as (46,−11). The amount of movement calculated in step S1203 is applied to generate the operation screen after the screen update in step S310, and the screen update is then executed. FIG. 13D illustrates how the operation screen after the screen update is displayed according to this exemplary embodiment.

Performing the aforementioned process control allows a sub-object included in an object to be designated to be displayed near a position estimated to be designated even when a screen update occurs at the moment that a user attempts to designate it. Therefore, erroneous operations may be reduced.

The present invention may be implemented by executing the following processes. That is, software (program) for implementing functions of the aforementioned exemplary embodiments is supplied to a system or an apparatus over a network or via a storage medium. A computer (such as a CPU or an MPU) in the system or apparatus reads out and executes the program.

According to the exemplary embodiments as described above, a display layout may be maintained after a display update, and erroneous operations may thus be reduced even when the timing for the display update and the timing for an input operation performed by a user occur simultaneously.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-267140, filed Dec. 25, 2013, which is hereby incorporated by reference herein in its entirety.

What is claimed is:

1. An information processing apparatus comprising:
a receiving unit configured to receive an update instruction to update at least a part of an image displayed on a display screen;
an estimating unit configured to estimate a target position on the display screen before designation of the target position on the display screen by a user operation;
a layout acquiring unit configured to acquire a position of an object to be laid out within the image on the display screen after the update, the object being displayed at the target position on the display screen before the update, in a case where an image displayed on the display screen is updated in response to the update instruction received by the receiving unit after the estimating unit estimates the target position; and
a display control unit configured to, in a case where the target position is different from the position acquired by the layout acquiring unit, display the object that has been displayed at the target position on the display screen before the update at the estimated target position on the display screen after the update.

2. The information processing apparatus according to claim 1, wherein
the target position is determined based on a touch with an indicator at a position on a touch panel display displaying the display screen; and
the estimating unit estimates the target position based on a position on the touch panel display to which the indicator is brought close.

3. The information processing apparatus according to claim 1, wherein
the target position is determined based on moving off of an indicator having touched the touch panel display displaying the display screen from the touch panel display; and
the estimating unit estimates the target position based on a position on the touch panel display touched by the indicator.

4. The information processing apparatus according to claim 1, wherein
the target position is determined based on a touch with a mouse click input to the display screen; and
the estimating unit estimates the target position based on a display position of a mouse cursor to be designated on the display screen.

5. The information processing apparatus according to claim 1, wherein the estimating unit estimates a position estimated as being gazed by a user as the target position on the display screen based on a result of detection of the line of sight of the user.

6. The information processing apparatus according to claim 1, further comprising an identifying unit configured to identify an object displayed at the target position, which is estimated by the estimating unit, in an image displayed on the display screen, wherein
the display control unit, also after the update, displays the object identified by the identifying unit at the target position estimated by the estimating unit.

7. The information processing apparatus according to claim 6, further comprising an executing unit configured to execute an operation associated with an object displayed at the determined target position on the display screen in response to the determination of the target position by a user operation.

8. The information processing apparatus according to claim 1, wherein the display control unit displays the object displayed at the target position estimated by the estimating unit at an identical position on a display screen before the update and a display screen after the update.

9. The information processing apparatus according to claim 1, wherein the receiving unit receives an update instruction occurring in response to an increase or decrease of contents of an image displayed on the display screen.

10. The information processing apparatus according to claim 1, wherein the display control unit overlaps on a display screen before the update a range where an object displayed at the target position estimated by the estimating unit is displayed and a range where an object is displayed on the display screen after the update.

11. The information processing apparatus according to claim 1, further comprising a moving amount determining unit configured to determine an amount of movement for translating an image to be displayed on the display screen after the screen update based on the target position estimated by the estimating unit and the layout acquired by the layout acquiring unit, wherein
the display control unit displays an image on the display screen after the update by translating it by an amount of movement determined by the moving amount determining unit from a predetermined display position.

12. The information processing apparatus according to claim 1, further comprising an identifying unit configured to identify an object present near the target position estimated by the estimating unit in an image displayed on the display screen, wherein
the moving amount determining unit determines the amount of movement such that the target position estimated by the estimating unit may be positioned at a center of a region where an object identified by the identifying unit is to be displayed in an image to be displayed on the display screen after the screen update.

13. The information processing apparatus according to claim 1, wherein the moving amount determining unit determines the amount of movement such that a positional correlation on the display screen before the update between the target position estimated by the estimating unit and an object identified by the identifying unit may be maintained also on the display screen after the update.

14. The information processing apparatus according to claim 1, wherein the moving amount determining unit determines an amount of movement for translating an image to be displayed on the display screen after the update such that the target position estimated by the estimating unit may be contained in a region where an object identified by the identifying unit is to be displayed.

15. The information processing apparatus according to claim 1, further comprising a probability acquiring unit configured to acquire a probability that at least one object displayed on the display screen will be operated based on the target position estimated by the estimating unit, wherein
the identifying unit identifies an object based on the probability acquired by the probability acquiring unit.

16. The information processing apparatus according to claim 1, wherein, in a case where an object to be displayed at the target position estimated by the estimating unit in an image to be displayed on the display screen is a complex object including a plurality of sub-objects,
the display control unit displays a sub-object displayed at the target position estimated by the estimating unit among the plurality of sub-objects at an identical position after the update and before the update.

17. The information processing apparatus according to claim 1, wherein an image displayed on the display screen is a Web page displayed on an execution screen of a Web browser application; and
the receiving unit receives an update instruction to update at least a part of the Web page displayed by using data newly received in a rendering process executed by the Web browser application while acquiring data over the Internet.

18. The information processing apparatus according to claim 1, wherein the update instruction occurs independently and asynchronously with the user operation.

19. A method for controlling an information processing apparatus, the method comprising:
receiving an update instruction to update at least a part of an image displayed on a display screen;
estimating a target position on the display screen before designation of the target position on the display screen by a user operation;
acquiring a position of an object to be laid out within the image on the display screen after the update, the object being displayed at the target position on the display screen before the update, in a case where an image displayed on the display screen is updated in response to the update instruction received by the receiving unit after the estimating unit estimates the target position; and
in a case where the target position is different from the position acquired, displaying the object that has been displayed at the target position on the display screen before the update at the estimated target position on the display screen after the update.

20. An information processing apparatus comprising:
a receiving unit configured to receive an update instruction to update at least a part of an image displayed on a display screen;
an estimating unit configured to estimate a target position on the display screen before a touch of the target position on the display screen by a user operation;
a layout acquiring unit configured to acquire a position of an object to be laid out within the image on the display screen after the update, the object being displayed at the target position on the display screen before the update, in a case where an image displayed on the display screen is updated in response to the update instruction received by the receiving unit after the estimating unit estimates the target position; and
a display control unit configured to, in a case where the target position is different from the position acquired by the layout acquiring unit, display the object that has been displayed at the target position on the display screen before the update at the estimated target position on the display screen after the update.

* * * * *